(12) United States Patent
Hamada et al.

(10) Patent No.: US 6,349,602 B1
(45) Date of Patent: Feb. 26, 2002

(54) SEAT OCCUPANT DETECTION APPARATUS

(75) Inventors: Makoto Hamada, Toyota; Osamu Fukawatase, Aichi-ken, both of (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 09/655,374

(22) Filed: Sep. 5, 2000

(30) Foreign Application Priority Data

Sep. 6, 1999 (JP) .......................................... 11-252163

(51) Int. Cl.[7] .................................................. G01B 7/16
(52) U.S. Cl. .......................................... 73/782; 73/749
(58) Field of Search .................... 73/768, 782, 795, 73/812, 849, 862.381

(56) References Cited

U.S. PATENT DOCUMENTS

| | | | |
|---|---|---|---|
| 4,107,645 A | 8/1978 | Lewis et al. | |
| 5,748,473 A | 5/1998 | Breed et al. | |
| 5,942,695 A | * 8/1999 | Verma et al. | 73/768 |
| 5,988,676 A | 11/1999 | Lotito et al. | |
| 5,991,676 A | 11/1999 | Podoloff et al. | |
| 6,039,344 A | 3/2000 | Mehney et al. | |
| 6,069,325 A | 5/2000 | Aoki | |
| 6,087,598 A | 7/2000 | Munch | |
| 6,092,838 A | 8/2000 | Walker | |
| 6,095,555 A | 8/2000 | Becker et al. | |

FOREIGN PATENT DOCUMENTS

| | | |
|---|---|---|
| JP | 07-301681 | 2/1995 |
| JP | 08-282358 | 4/1995 |
| JP | 09-301120 | 5/1995 |
| JP | 09-150662 | 11/1995 |
| JP | 10-194024 | 1/1997 |
| JP | 10-236274 | 2/1997 |
| JP | 09-207638 | 8/1997 |
| JP | 09-240424 | 9/1997 |
| JP | 10-297334 | 11/1998 |
| JP | 11-001153 | 1/1999 |
| JP | 11-001154 | 1/1999 |
| JP | 11-108746 | 4/1999 |

* cited by examiner

*Primary Examiner*—Max Noori
(74) *Attorney, Agent, or Firm*—Finnegan, Henderson, Farabow, Garrett & Dunner, L.L.P.

(57) ABSTRACT

A beam is mounted to a mounting flange. A seat pan is mounted to opposite end portions of the beam. Provided near a middle portion of the beam is a sensor unit for detecting flexure of the middle portion of the beam. The sensor unit has a sensor beam whose length is sufficiently less than the distance between fulcrums of the beam, and a transmission member that transmits the flexure of the beam occurring at a middle point thereof to the sensor beam. The sensor beam is provided with a strain sensor.

11 Claims, 13 Drawing Sheets

SEAT OCCUPANT DETECTION APPARATUS

BACKGROUND OF THE INVENTION

1. Field of the Invention

The present invention relates to a seat occupant detection apparatus and, more particularly, to a seat occupant detection apparatus that is suitable to accurately detect a load of a seated occupant without involving a reduction in the mounting strength of a seat of a vehicle.

2. Description of the Related Art

Vehicular seat occupant detection apparatuses have been known, as disclosed in, for example, Japanese Patent Application Laid-Open No. HEI 9-207638. An occupant detection apparatus disclosed in the laid-open patent application has load sensors that are disposed between a vehicle body floor and lower seat rails for guiding a vehicular seat. The load sensors are disposed between the lower seat rails and seat-mounting portions provided on the vehicle body floor, at forward and rearward end portions of the lower seat rails, and are fastened to the seat-mounting portions together with the lower seat rails, by bolts. When an occupant sits on the seat, loads corresponding to the occupant's weight act on the load sensors. Therefore, based on output signals of the load sensors, the above-described seat occupant detection apparatus is able to detect the presence or absence of an occupant on the seat and the load of the seat occupant.

The load sensors are fastened to the floor together with the lower seat rails as described above. Therefore, if the fastening loads on the lower seat rails are increased, the loads acting on the load sensors when there is no occupant on the seat become greater. In this case, the proportion of a difference between the load value detected by the load sensors when there is no occupant on the seat and the load value detected when there is an occupant on the seat becomes small, so that the precision of occupant load measurement decreases. If the fastening load is reduced in order to avoid the aforementioned drawback, the mounting strength of the seat tracks decreases so that drawbacks, such as occurrence of rattling and the like, may occur.

Furthermore, in the conventional occupant detection apparatus, the load sensors are disposed between the lower seat rails and the vehicle floor as mentioned above. Therefore, when the seat is slid forward or rearward relative to the seat track, the distribution of loads on the forward and rearward load sensors changes. If the amount of slide of the seat becomes great, there may occur an event that pulling loads act on load sensors. In that event, it becomes impossible to accurately detect the load of an occupant by the load sensors.

The disclosure of Japanese Patent Application No. HEI 11-252163 filed on Sep. 6, 2000 including the specification, drawings and abstract is incorporated herein by reference in its entirety.

SUMMARY OF THE INVENTION

It is an object of the invention to provide a seat occupant detection apparatus capable of accurately detecting the load of a seated occupant without involving a reduction in the mounting strength of a vehicular seat.

In accordance with the invention, a seat occupant detection apparatus comprises a beam member that is displaced in accordance with a load of an occupant seated on a vehicular seat, and load detecting means for detecting the load based on an amount of displacement of the beam member.

In the seat occupant detection apparatus of the invention, the beam member is displaced in accordance with the load of an occupant seated on the vehicular seat. The mounting strength of the beam member at support points does not affect the load-displacement characteristic of the beam member. Therefore, according to the invention, it becomes possible to detect the load of a seated occupant without involving a reduction in the mounting strength of the vehicular seat.

Furthermore, the beam member may be connected between a seat frame and a seat pan of the vehicular seat.

In the above construction, the beam member is connected between the seat frame and the seat pan of the vehicular seat. When the vehicular seat is slid forward or rearward, the seat pan and the seat frame are displaced together with the vehicular seat. Therefore, the distribution of loads inputted to the beam member does not change regardless of the slide position of the vehicular seat. Therefore, according to the invention, it becomes possible to more accurately detect the load of a seated occupant without being affected by the slide position of the vehicular seat.

Furthermore, the beam member may be connected, at first mounting positions provided near opposite end portions of the beam member, to one of the seat pan and the seat frame, and the beam member may be connected to another one of the seat pan and the seat frame, at second mounting positions that are positioned at a predetermined distance inward from the first mounting positions on the beam member.

Furthermore, the beam member may be an elastic member having a predetermined flexural rigidity, and the load detecting means may detect the load based on a flexure of the beam member.

Furthermore, the beam member may be an elastic member having a predetermined flexural rigidity, and the load detecting means may detect the load based on an amount of flexure of a substantially middle portion of the beam member in a direction of a length of the beam member.

In the above construction, at first mounting positions provided near opposite end portions of the beam member, to one of the seat pan and the seat frame, and the beam member is connected to the other one of the seat pan and the seat frame, at second mounting positions that are positioned at a predetermined distance inward from the first mounting positions on the beam member. The beam member is supported at the mounting points of the seat frame, and the load of a seated occupant is inputted to the mounting points of the seat pan. That is, in the beam member, one group of the first mounting positions and the second mounting positions become fulcrums, and the other group of mounting positions become load input points. The beam member is an elastic member having a predetermined flexural rigidity, and the load of a seated occupant is detected based on the amount of flexure of a substantially middle portion of the beam member. In this construction, the effect that a change of the distribution of loads inputted to the two load input points has on the amount of flexure of the middle portion of the beam member is small. Therefore, according to the invention, it becomes possible to detect the load of a seated occupant with a high precision even if the seated position of the occupant changes.

Furthermore, the seat occupant detection apparatus may further include a strain amplifying mechanism that amplifies a strain associated with the flexure of the beam member, and the load detecting means may detect the load based on the strain amplified by the strain amplifying mechanism.

According to the above construction, the provision of the strain amplifying mechanism for amplifying the strain associated with the flexure of the beam member having an elasticity makes it possible to detect the flexure of the beam member, that is, the load of a seated occupant, with a higher precision.

Furthermore, the strain amplifying mechanism may include a second elastic beam member that is supported by one of the seat pan and the seat frame and that has a length that is less than a length of the beam member, and a transmission member that transmits the flexure of the beam member to the second elastic beam member, wherein the load detecting means detects the load based on the strain of the second elastic beam member.

In the above construction, the flexure of the beam member is transmitted to the second elastic beam member. The second beam member has a less length than the beam member. In general, if the flexure of a beam member is constant, the magnitude of strain that occurs in association with the flexure is inversely proportional to the square of the length of the beam member. Therefore, according to the invention, the second elastic beam member is caused to have a strain that is greater than a strain that occurs in the beam member.

Furthermore, the strain amplifying mechanism may be a small-section modulus portion provided by forming a portion of the beam member so that a section modulus of the portion with respect to a neutral axis of the portion is less than the section modulus of another site of the beam member, and the load detecting means may detect the load based on the strain of the small-section modulus portion.

In the above construction, the beam member is provided with a small-section modulus portion that has a smaller section modulus with respect to the neutral axis than other sites of the beam member. In general, if the bending moment that occurs to the beam member is constant, the strain that occurs on a surface of the beam member is inversely proportional to the section modulus. Therefore, the small-section modulus portion of the beam member receives greater strain than other sites of the beam member.

Furthermore, the small-section modulus portion may be formed by making a section of a portion of the beam member smaller than a section of another site of the beam member.

Furthermore, the beam member may be substantially a rigid body and may be pivotably connected to the seat pan and the seat frame.

In the above construction, since the beam member is substantially a rigid body, the beam member pivots in accordance with a load that is inputted to the beam member. Therefore, it becomes possible to detect the load of a seated occupant in accordance with the amount of pivot of the beam member.

Furthermore, the seat occupant detection apparatus may further include an elastic member that elastically deforms in accordance with a pivot of the beam member, and the load detecting means may detect the load based on an amount of elastic deformation of the elastic member.

In the above construction, the load of a seated occupant is detected based on the amount of elastic deformation of the elastic member that elastically deforms in accordance with the pivot of the rigid beam member. Therefore, the load measurement precision is dependent only on the elastic characteristics of the elastic member, and is not affected by the mechanical characteristics of the beam member. Hence, the quality control of the component parts becomes easier.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
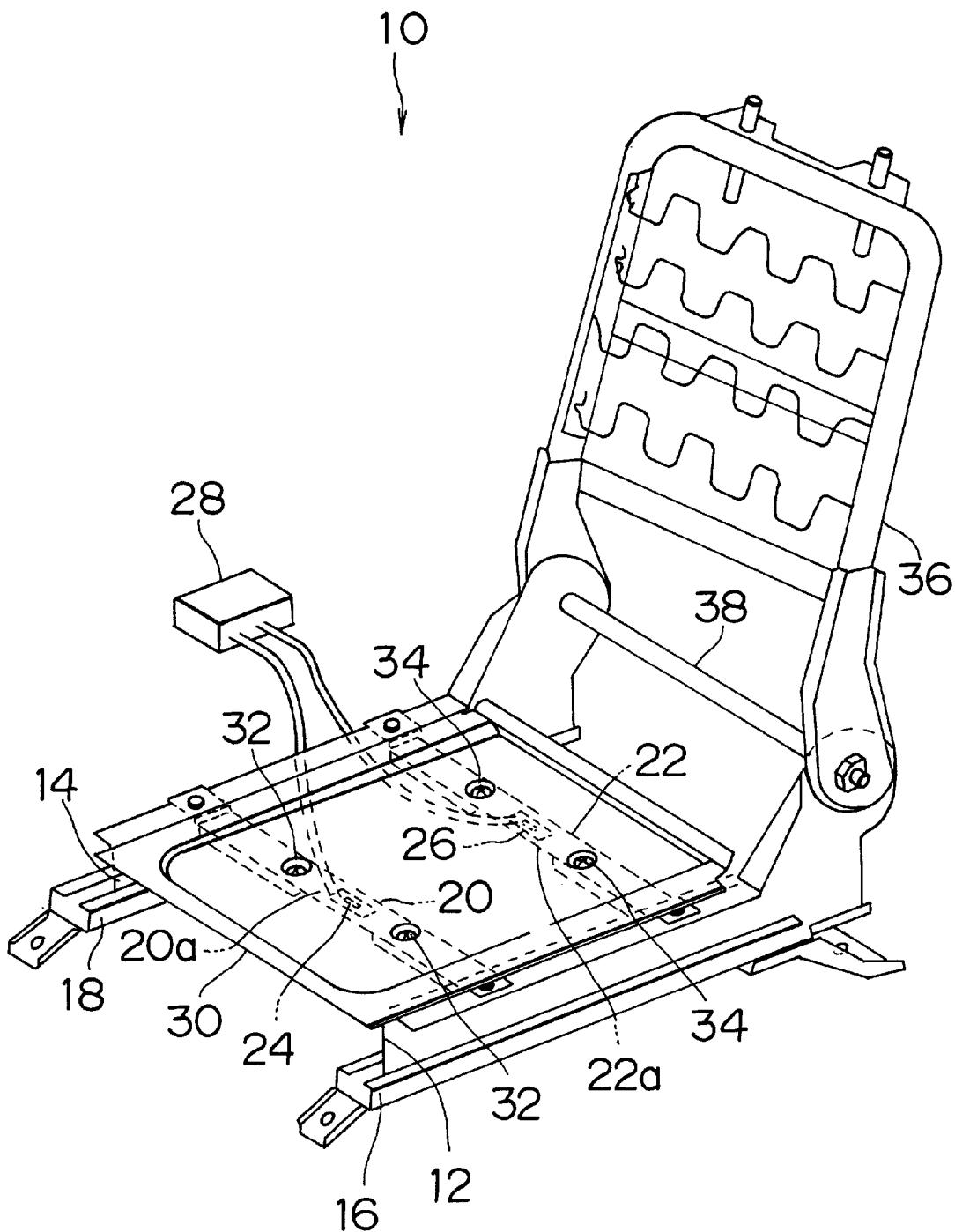
FIG. 1 is a perspective view of a vehicular seat incorporating a seat occupant detection apparatus according to a first embodiment of the invention.

FIG. 1 is a perspective view of a vehicular seat 10 incorporating a seat occupant detection apparatus according to a first embodiment of the invention. As shown in FIG. 1, the vehicular seat 10 has, on its both sides, two upper seat rails 12, 14 extending parallel to each other and oriented in a traveling direction of a vehicle. The upper seat rails 12, 14 are guided for movements forward and rearward with respect to the vehicle, by lower seat rails 16, 18 secured to a compartment floor of the vehicle.

The upper seat rails 12, 14 are interconnected by beam members 20, 22 that extend parallel to each other and oriented in directions of a width of the vehicle generally traverse to the upper seat rails 12, 14. Each of the beam members 20, 22 has, approximately in its middle portion, a reduced-width portion 20a, 22a whose sectional area is smaller than that of other sites. Strain sensors 24, 26 are disposed on lower surfaces of the reducedsection portions 20a, 22a, respectively. The strain sensors 24, 26 are connected to a controller 28, and output to the controller 28 electric signals corresponding to strains that occur in the reduced-section portions 20a, 22a. Based on the output signals of the strain sensors 24, 26, the controller 28 detects strains of the reduced-width portions 20a, 22a.

A seat pan 30 is disposed above the beam members 20, 22. The seat pan 30 is secured to the beam members 20, 22 by fasteners 32, 34 via rubber bushes or the like, at positions on the seat pan 30 that are symmetrical about the reduced-width portions 20a, 22a. A seat cushion (not shown) is disposed on an upper surface of the seat pan 30. A seatback 36 is connected to end portions of the lower seat rails 16, 18 that are located rearward in the traveling direction of the vehicle, in such a manner that the seatback 36 is pivotable about a shaft 38.

According to the above-described arrangement, when an occupant sits on the vehicular seat 10, the load of the occupant is transmitted to the beam members 20, 22 via the seat cushion and the seat pan 30. The beam members 20, 22 receive strains corresponding to the loads transmitted from the seat pan 30, that is, corresponding to the weight of the occupant. In this arrangement, each of the reduced-width portions 20a, 22a has a smaller sectional area than other portions of beam members 20, 22, and therefore has a reduced section modulus with respect to the neutral axis. In general, the strain caused on a surface of a beam by a given bending moment occurring in the beam is greater if the section modulus of the beam is smaller. Therefore, since the strain sensors 24, 26 are provided on the reduced-width portions 20a, 22a, this embodiment makes it possible to detect moments that occur in the beam members 20, 22 as amplified stresses. Thus, in this embodiment, the weight of an occupant can be detected with a high precision.

In this embodiment, since an occupant's weight is detected based on the flexing deformations of the beam members 20, 22 as mentioned above, the measurement precision is not affected at all if the fastening forces on various fastened portions (i.e., mounting portions of the upper seat rails 12, 14 to the beam members 20, 22, and mounting portions of the lower seat rails 16, 18 to the compartment floor) are increased. Therefore, this embodiment allows accurate detection of the load of an occupant without involving a reduction in the mounting strength of the vehicular seat.

Furthermore, in this embodiment, the beam members 20, 22 for detection of an occupant's load are fixed to the upper seat rails 12, 14. Therefore, if the vehicular seat 10 is slid forward or rearward, the beam members 20, 22 move together with the seat pan 30, so that the distribution of loads acting on the beam members 20, 22 does not change. Hence, this embodiment allows an occupant's load to be accurately detected even if the vehicular seat 10 is considerably slid forward or rearward.

If the seated position of an occupant shifts forward or rearward, the distribution of loads acting on the beam members 20, 22 correspondingly changes. However, the sum of loads acting on the beam members 20, 22 always equals the load of the occupant regardless of the seated position. Therefore, by determining the sum of loads on the beam members 20, 22, it is possible to accurately detect the load of an occupant regardless of the seated position of the occupant. Furthermore, based on the magnitudes of loads on the beam members 20, 22, it is also possible to detect the front-rear distribution of a vehicle weight, that is, the occupant's seated position on the vehicle seat in the front-rear direction.

Figure 2:
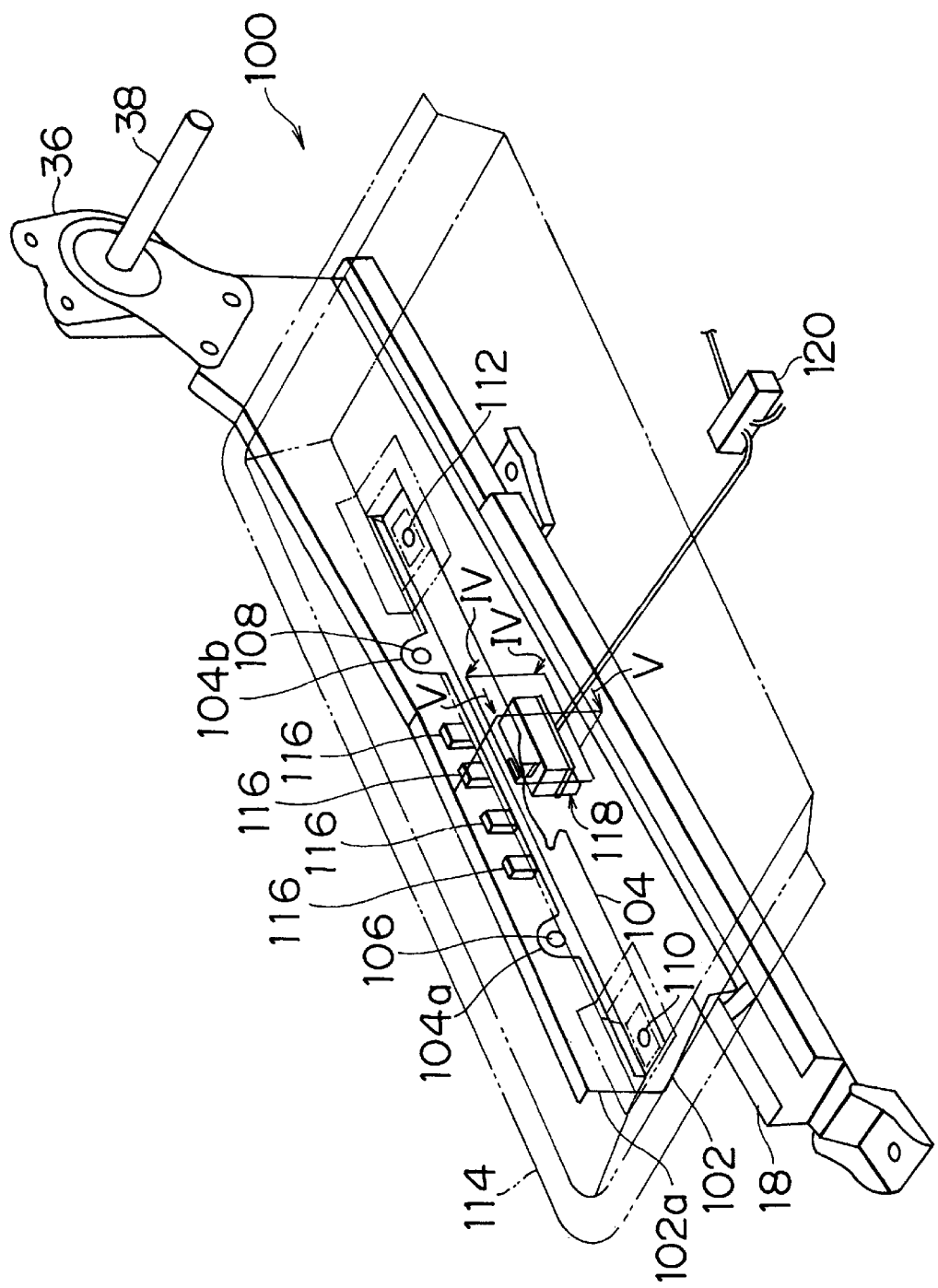
FIG. 2 is a perspective view of a seat occupant detection apparatus according to a second embodiment of the invention.

A second embodiment of the invention will next be described. FIG. 2 is a perspective view illustrating portions of a seat occupant detection apparatus according to this embodiment. Portions in FIG. 2 substantially the same as those in FIG. 1 are represented by the same reference characters, and will not be described again. Although FIG. 2 shows only an arrangement on the side of a right-side lower seat rail 18 from a viewpoint of a seat occupant, an arrangement substantially symmetrical to that shown in FIG. 2 is provided on the side of the lower seat rail 16.

As shown in FIG. 2, a vehicular seat 100 has a seat frame 102. The seat frame 102 is guided by the lower seat rail 18 so as to be movable forward and rearward with respect to a vehicle. The seat frame 102 is an open case-like member, and has, on each side portion thereof in the direction of a width of the vehicle, a mounting flange 102a extending substantially vertically upward.

A beam member 104 extending in the traveling direction of the vehicle is mounted to the seat frame 102. The beam member 104 is an elastic beam member having a predetermined flexural rigidity in up-down directions. The beam member 104 has two upwardly protruded support portions 104a, 104b at positions substantially symmetrical about the midpoint of the beam member 104 in the fore-aft direction of the vehicle. The support portions 104a, 104b of the beam member 104 and the seat frame 102 are interconnected by fasteners 106, 108 so as to allow pivoting movements.

A seat pan 114 is secured to opposite end portions of the beam member 104 by fasteners 110, 112. A seat cushion (not shown) is disposed on an upper surface of the seat pan 114. Therefore, when an occupant sits on the vehicular seat 100, loads corresponding to the occupant's weight are inputted to the opposite ends of the beam member 104 via the seat pan 114.

Figure 3:
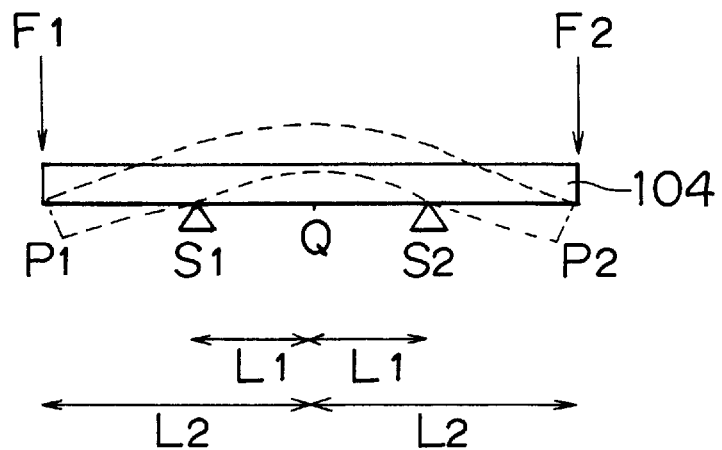
FIG. 3 is a model diagram wherein a beam member of the seat occupant detection apparatus of the embodiment is considered as a beam.

FIG. 3 is a model diagram wherein the beam member 104 is considered as a beam. As mentioned above, the beam member 104 is mounted at the support portions 104a, 104b to the seat frame 102 so as to be pivotable relative to the seat frame 102. Therefore, as shown in FIG. 3, the beam member 104 can be considered as a beam that is simply supported at fulcrums $S_1$, $S_2$ that correspond to the support portions 104a, 104b Furthermore, loads $F_1$, $F_2$ corresponding to the weight of an occupant on the vehicular seat 100 are inputted as downward loads to opposite end points $P_1$, $P_2$ that correspond to the mounting points of the beam member 104 to the seat pan 114. In this case, an upwardly convex flexure occurs to the beam member 104 as indicated by a broken line in FIG. 3. In FIG. 3, the midpoint of the beam member 104 is indicated by "Q".

Referring back to FIG. 2, the mounting flange 102a of the seat frame 102 has one or more (e.g., four) stopper portions 116 near a middle portion of the mounting flange 102a in the fore-aft direction of the vehicle. The stopper portions 116 are formed by cutting and bending portions of the mounting flange 102a into rectangular lugs. The stopper portions 116 function to interfere with the beam member 104 when the middle portion of the beam member 104 is flexed upward to a predetermined amount, and to prevent a further flexure of the beam member 104, as described in detail below.

A sensor unit 118 is provided near a substantially middle portion of the beam member 104. The sensor unit 118 is electrically connected to a controller 120, and outputs to the controller 120 a signal corresponding to the amount of flexure of the beam member 104.

Figure 4:
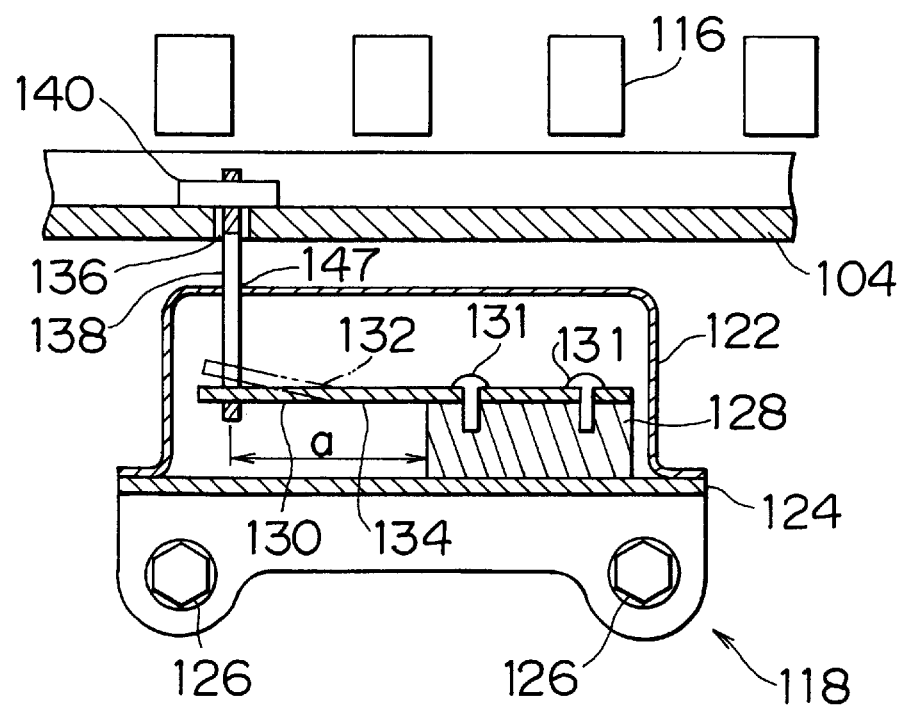
FIG. 4 is a cross-sectional view of a sensor unit of the seat occupant detection apparatus of the embodiment taken on plane IV—IV in FIG. 2.
Figure 5:
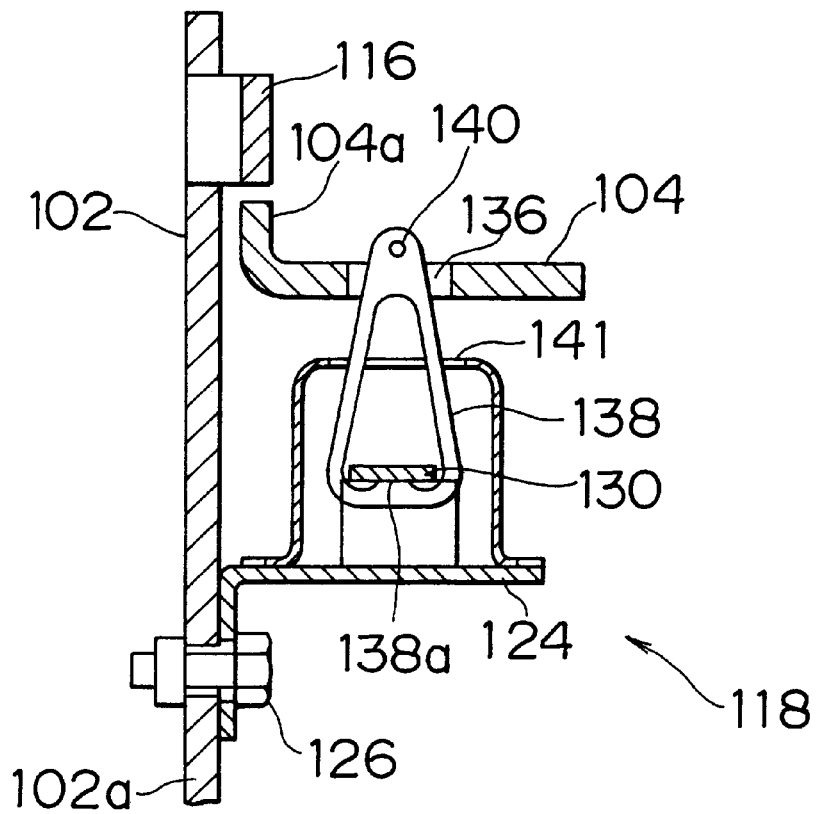
FIG. 5 is a section view of the sensor unit of the seat occupant detection apparatus of the embodiment taken on plane V—V indicated in FIG. 2.

FIGS. 4 and 5 are sectional views of the sensor unit 118 taken on planes IV—IV and V—V respectively, indicated in FIG. 2.

As shown in FIGS. 4 and 5, the sensor unit 118 has a case 122. The case 122 is secured to the mounting flange 102a of the seat frame 102 by a fastener 126 via an L-shaped mounting plate 124. The case 122 is disposed so that a middle of the case 122 in the fore-aft direction of the vehicle is positioned at a predetermined distance from the middle of the beam member 104 toward, for example, the rear of the vehicle. A base member 128 is secured within the case 122. A sensor beam 130 having a predetermined flexural rigidity is secured to an upper surface of the base member 128 by small screws 131. The sensor beam 130 extends from the base member 128 forward with respect to the vehicle (leftward in FIG. 2) beyond the middle point of the beam member 104. As is apparent from FIGS. 2, 4 and 5, the sensor beam 130 has a length that is sufficiently less than the length of the beam member 104.

Strain sensors 132, 134 are mounted on upper and lower surfaces of a portion of the sensor beam 130 that is protruded a predetermined distance from the base member 128. The strain sensors 132, 134 output to the controller 120 signals corresponding to the amount of flexure of the sensor beam 130. When the sensor beam 130 is flexed upward, the upper surface and the lower surface of the sensor beam 130 have a compressive strain and a tensile strain, respectively, corresponding to the amount of flexure. Therefore, by determining the difference between the output signals of the strain sensors 132, 134, the controller 120 can detect the flexure of the sensor beam 130 with an increased precision and can cancel the strain of the sensor beam 130 caused by thermal expansion.

A slit-like opening 136 extending in the direction of width of the vehicle is formed in a middle portion of the beam member 104 in the direction of the length of the beam member 104. An annular transmission member 138 having a generally triangular shape is inserted through the opening 136. The transmission member 138 is supported at its upper end portion by the beam member 104 via a pin 140 that extends in the fore-aft direction of the vehicle. The transmission member 138 extends into the case 122 through an opening 141 formed in an upper wall of the case 122. A distal end portion of the sensor beam 130 extends through an inside opening of the transmission member 138. The sensor beam 130 is disposed so as to contact a protrusion 138a formed on a bottom side of an inner peripheral surface of the transmission member 138 when neither the beam member 104 nor the sensor beam 130 is flexed.

As described above, when an occupant sits on the vehicular seat 100, a middle portion of the beam member 104 flexes upward in accordance with the load of the occupant. Due the upward flexure of the beam member 104, the transmission member 138 is displaced upward, so that the distal end portion of the sensor beam 130 has an amount of upward flexure that is substantially equal to the amount of flexure of the middle portion of the beam member 104. Therefore, by detecting the flexure of the sensor beam 130 based on the output signals of the strain sensors 132, 134, it is possible to detect the flexure of the beam member 104, that is, to detect the load of the occupant. The arrangement as shown in FIG. 2 is provided on each of two sides of the vehicular seat 100, as mentioned above. Therefore, the load of the occupant is determined by summing the loads detected by the sensor units 118 provided on the two sides of the vehicular seat 100.

As shown in FIG. 5, a side end portion of the beam member 104 has a flange portion 104a that is bent upward so that an end surface of the flange portion 104a faces the stopper portions 116. When the middle portion of the beam member 104 is flexed upward to a predetermined amount, the end surface of the flange portion 104a contacts the stopper portions 116, thereby preventing an excessively great flexure of the beam member 104.

In this embodiment, the same amount of flexure as the amount of flexure that occurs to the middle portion of the beam member 104 occurs to the distal end portion of the sensor beam 130, as mentioned above. The length of a portion of the sensor beam 130 protruded from the base member 128 (that is, if the sensor beam 130 is considered as a cantilever, the length of the cantilever) a is sufficiently less than the length b of a portion of the beam member 104 between the support portions 106, 108 (that is, if the beam member 104 is considered as a beam, the simple length thereof between the fulcrums $S_1$, $S_2$).

Figure 6:
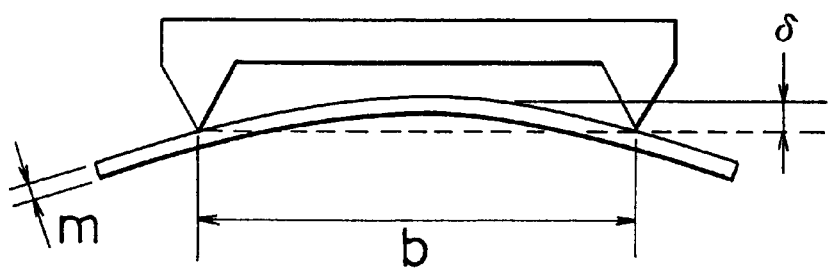
FIG. 6 is a diagram illustrating a relationship between flexure and strain of a beam when the beam is flexed.

FIG. 6 is a diagram illustrating a relationship between the distance b between the fulcrums and a strain $\epsilon_1$ that occurs to the beam member 104 when the beam member 104 is flexed. As indicated in FIG. 6, if the thickness $h_1$, the beam member 104 and the flexure 8 of opposite ends of the beam member 104 with reference to the midpoint between the fulcrums where the beam member 104 is considered as a straight beam, the strain $\epsilon_1$ occurring on the surface of the beam member 104 can be expressed by the following expression:

$$\epsilon_1 = 4 * h_1 * \delta / b^2 \quad (1)$$

With regard to the sensor beam 130 considered as a cantilever, a strain $\epsilon_2$ of the cantilever can be expressed by the following expression (where $h_2$ is the thickness of the sensor beam 130), if the midpoint between the fulcrums of the beam shown in FIG. 6 is considered as a fixed end and b=2* a is substituted in expression (1).

$$\epsilon_2 = h_2 \delta / a^2 \quad (2)$$

Therefore, in this embodiment, since the sensor beam 130 having a relatively reduced length is caused to have the same amount of flexure as the amount of flexure that occurs to the beam member 104 having a relatively increased length, the amount of strain that occurs to the sensor beam 130 becomes a great amount that is amplified to $\epsilon_2/\epsilon_1=(h_2/h_1)*(b/a)^2/4$ times (b>>a) as great as the amount of strain that occurs to the beam member 104. By detecting the strain of the sensor beam 130, it is possible to detect the load of a seated occupant with a higher precision.

Furthermore, as in the first embodiment, the beam member 104 is mounted to the seat frame 102, so that if the vehicular seat 100 is slid forward or rearward, the load input to the beam member 104 is not affected by the movement of the vehicular seat 100. Therefore, in the second embodiment, the weight of an occupant can be accurately detected even if the vehicular seat 100 is considerably slid forward or rearward. Still further, since the weight of an occupant is detected based on the flexing deformation of the beam member 104, the measurement precision is not affected at all if the fastening forces on various fastened portions (i.e., mounting portions of the seat pan 114 to the beam member 104, and mounting portions of the lower seat rail 18 to the compartment floor) are increased. Therefore, this embodiment allows accurate detection of the load of an occupant without involving a reduction in the mounting strength of the vehicular seat.

As can be understood from expression (2), the strain that occurs to the sensor beam 130 in response to a given amount of flexure is proportional to the thickness $h_2$. Therefore, it is advantageous to increase the thickness $h_2$ in order to cause a great strain in the sensor beam 130. However, if the thickness $h_2$ of the sensor beam 130 is excessively increased, the flexural rigidity of the sensor beam 130 increases so that the flexure that occurs to the beam member 104 is reduced. Therefore, in this embodiment, the thickness of the sensor beam 130 is set to such a small value that the flexure rigidity of the sensor beam 130 does not affect the amount of flexure that occurs to the beam member 104.

The bending moment M at the midpoint Q of the beam member 104 can be expressed as in $M=(F_1+F_2)*(L_2-L_1)/2$ where $L_1$ is the distance from the midpoint Q to the fulcrums $S_1$, $S_2$; $L_2$ is the distance from the midpoint Q to the opposite end points (points of load) $P_1$, $P_2$; and $F_1$ and $F_2$ are loads inputted to the points of load. That is, the moment M becomes a value corresponding to the sum $(F_1+F_2)$ of the loads $F_1$, $F_2$ (i.e., the load of the seated occupant), and is not affected by a change of the distribution of loads $F_1$, $F_2$. Therefore, even if the seated position of an occupant shifts forward or rearward and the distribution of the loads $F_1$, $F_2$ changes, the effect of the distribution change on the amount of flexure at the midpoint of the beam member 104 is controlled to a low level. Consequently, since the amount of flexure at the midpoint of the beam member 104 is measured, this embodiment allows the load of a seated occupant to be accurately measured regardless of the seated position of the occupant.

A third embodiment of the invention will next be described. A seat occupant detection apparatus of this embodiment has a construction based on that of the seat occupant detection apparatus of the second embodiment, wherein the sensor unit 118 is replaced by a sensor unit 200 and a rectangular opening 202 is formed in a middle portion of the beam member 104.

Figure 7:
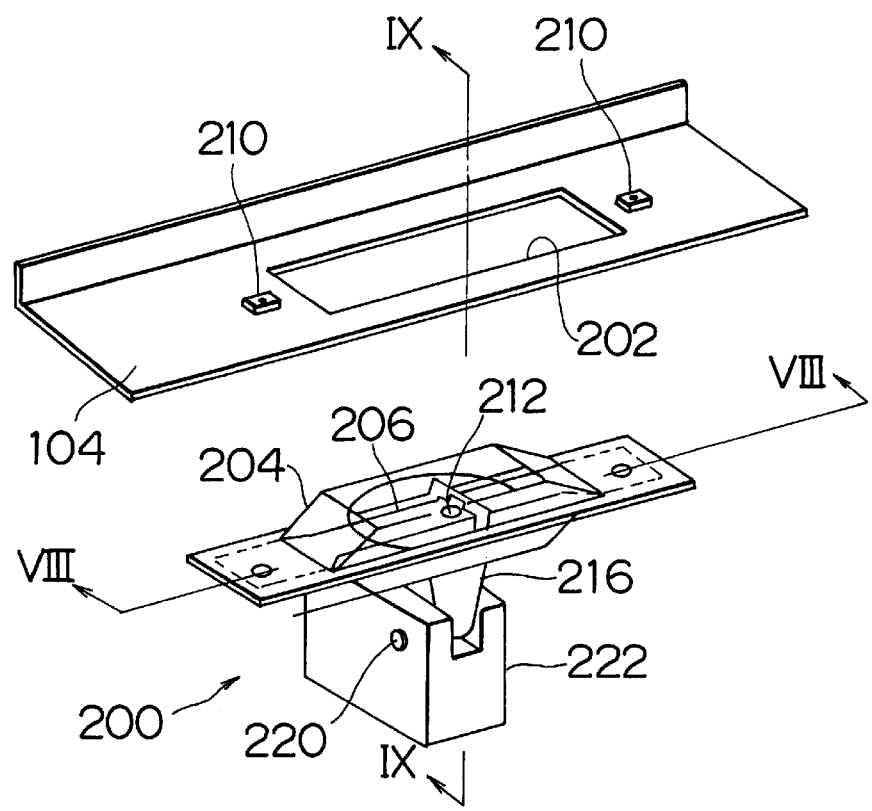
FIG. 7 is a perspective view illustrating a sensor unit of a seat occupant detection apparatus according to a third embodiment of the invention, where the sensor unit is detached from a beam member.
Figure 8:
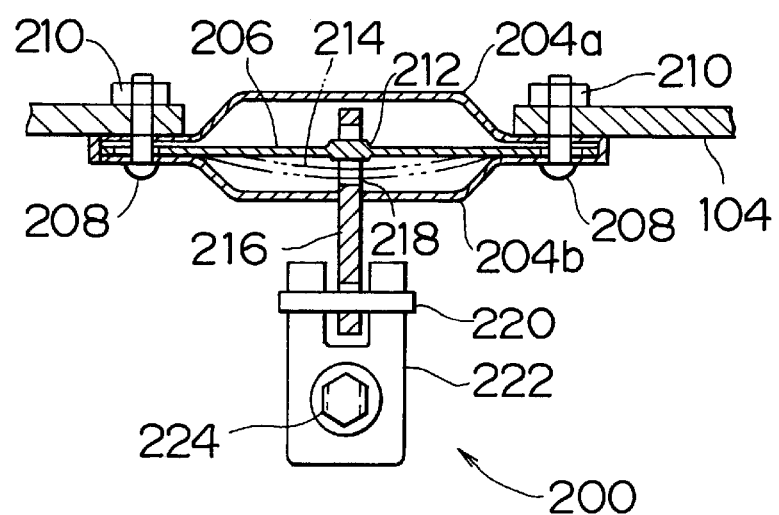
FIG. 8 is a cross-sectional view of a sensor unit of the embodiment taken along line VIII—VIII indicated in FIG. 7.
Figure 9:
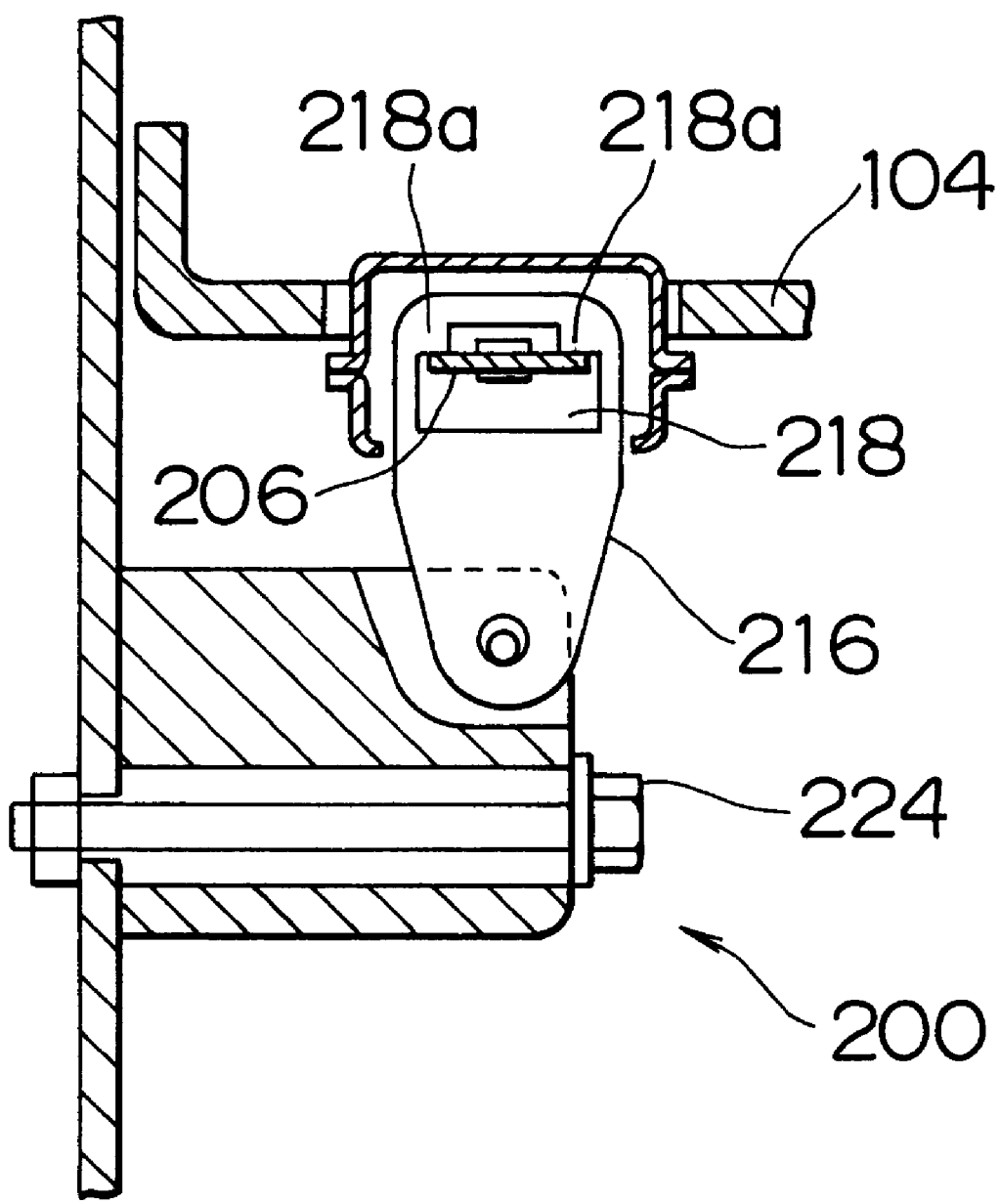
FIG. 9 is a sectional view of the sensor unit of the embodiment taken along line IX—IX indicated in FIG. 7.

FIG. 7 is a perspective view illustrating the sensor unit 200 of this embodiment detached from the beam member 104. FIGS. 8 and 9 are sectional views of the sensor unit 200 taken along line VIII—VIII and line IX—IX indicated in FIG. 7.

As shown in FIGS. 7 to 9, the sensor unit 200 of this embodiment has a case 204. The case 204 is formed by joining an upper case 204a and a lower case 204b in a vertical direction. A sensor beam 206 is provided within the case 204. As is apparent from FIG. 7, the sensor beam 206 has a length that is sufficiently less than the length of the beam member 104. The case 204 is disposed so that a portion of the case 204 is positioned within the opening 202 formed in the beam member 104. The case 204 is secured together with the sensor beam 206 to the beam member 104 at positions at opposite sides of the opening 202 in the direction of a length of the opening 202, by bolts 208 and nuts 210.

Strain sensors 212, 214 are disposed on upper and lower surfaces of a middle portion of the sensor beam 206 in the direction of the length of the sensor beam 206. The strain sensors 212, 214 are electrically connected to a controller 120 (not shown in FIGS. 7 to 9), and outputs to the controller 120 signals corresponding to the strains that occur to the sensor beam 206. Based on the difference between the output signals of the strain sensors 212, 214, the controller 120 detects the flexure of the sensor beam 206, as in the first embodiment.

The sensor unit 200 has a transmission member 216. The transmission member 216 is a platy member having an opening portion 218 in an upper portion thereof. The transmission member 216 is disposed so that a middle portion of the sensor beam 206 in the direction of the length thereof extends through the opening portion 218 of the transmission member 216. As shown in FIG. 9, the opening portion 218 is provided with protrusions 218a that are formed at opposite end portions of an upper edge of the opening portion 218. The protrusions 218a are in contact with opposite side portions of the upper surface of the sensor beam 206 in the direction of a width of the strain sensor 212. Thus, the transmission member 216 does not contact with the strain sensor 212, thereby preventing pressing force from the transmission member 216 or the like from affecting output signals of the strain sensor 212.

The transmission member 216 extends downward through an opening formed in the lower case 204b. The transmission member 216 is connected at its lower end portion to a base member 222 via a pin 220 extending parallel to the length of the beam member 104, in such a manner that the transmission member 216 is pivotable relative to the base member 222. The base member 222 is secured to a mounting flange 102a of the seat frame 102 by a bolt 224.

When an occupant sits on the vehicular seat 100, a middle portion of the beam member 104 flexes upward in accordance with the load from the occupant, as in the second embodiment. In this case, although the sensor beam 206 tends to move upward together with the beam member 104, a middle portion of the sensor beam 206 is prevented from moving upward by the transmission member 216 connected to the side of the seat frame 102. As a result, the sensor beam 206 has a downwardly convex flexure corresponding to the load of the seated occupant, and the strain sensors 212, 214 outputs signals corresponding to the strains caused by the flexure. Therefore, in this embodiment, the controller 120 can detect the load of the seated occupant based on the output signals of the strain sensors 212, 214.

In this embodiment, too, flexure of the beam member 104 having a greater length is transmitted to the sensor beam 206 having a smaller length, and the strains occurring in the sensor beam 206 are detected. Therefore, flexure of the beam member 104 can be detected as amplified strains. Therefore, it becomes possible to detect the load of a seated occupant with a high precision.

To assemble the sensor unit 200 of this embodiment, the sensor beam 206 is first inserted into the opening 218 of the transmission member 216, and then the sensor beam 206, the upper case 204a and the lower case 204b are mounted to the beam member 104. Then, the base member 222 is connected to the transmission member 216 via the pin 220. Subsequently, the transmission member 216 is disposed on the midpoint of the sensor beam 206 so as to balance due to its own weight, that is, so as to has a vertically directed posture. While this state is maintained, the base member 222 is positioned in up-down directions and is secured to the mounting flange 102a of the seat frame 102 so that the strains of the sensor beam 206 detected by the strain sensors 212, 214 become approximately zero. Since the horizontal position of the base member 222 is automatically defined by the balance of the transmission member 216 based on its own weight as described above, the base member 222 needs to be positioned only in the vertical direction. Thus, this embodiment facilitates the assembling and mounting of the sensor unit 200. The zero point of the output signals of the strain sensors 212, 214 can be electrically corrected. Therefore, the strains of the sensor beam 206 do not need to equal zero when the base member 222 is positioned in the vehicle direction. The vertical position of the base member 222 may be defined within such a range that the sensor beam 206 does not contact the lower case 204b when an occupant sits on the vehicle seat.

Although in the second and third embodiments, the mounting points of the seat pan 114 to the beam member 104 (i.e., load input points) are positioned outwardly of the mounting points of the beam member 104 to the seat frame 102, the fulcrums of the beam member 104 may instead be provided outwardly of the load input points. In this case, the beam member 104 is flexed to convex downward.

Furthermore, in the second and third embodiments, the beam member 104 is mounted to the seat frame 102 by fasteners 106, 108. The fasteners 106, 108 may be, for example, stepped bolts or the like, so that the beam member 104 is pivotable relative to the seat frame 102. In this case, the amount of flexure corresponding to a given load increases, so that the precision of the load measurement can be increased, in comparison with a case where the beam member 104 is completely fixed to the seat frame 102.

Figure 10:
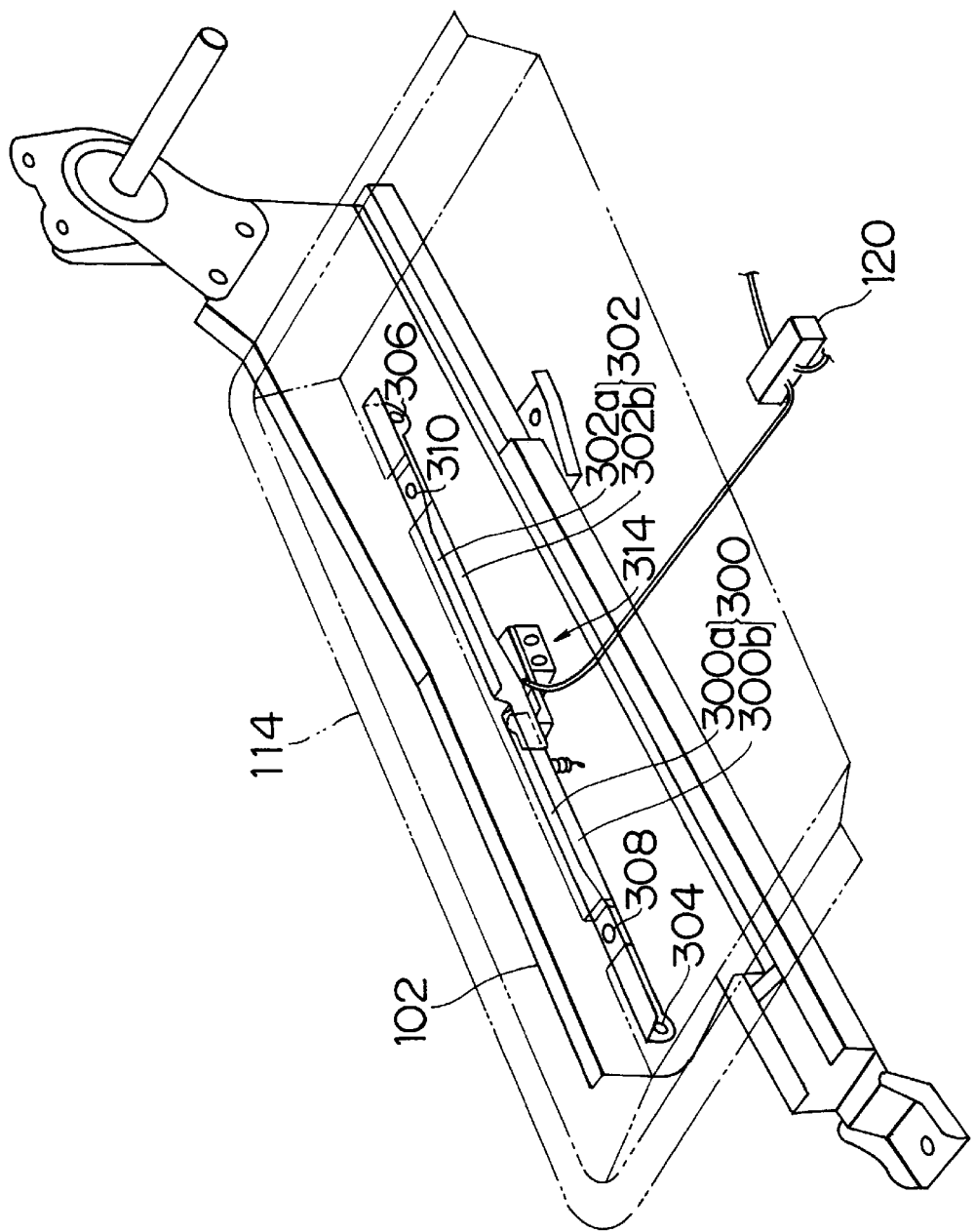
FIG. 10 is a perspective view of a seat occupant detection apparatus according to a fourth embodiment of the invention.
Figure 11:
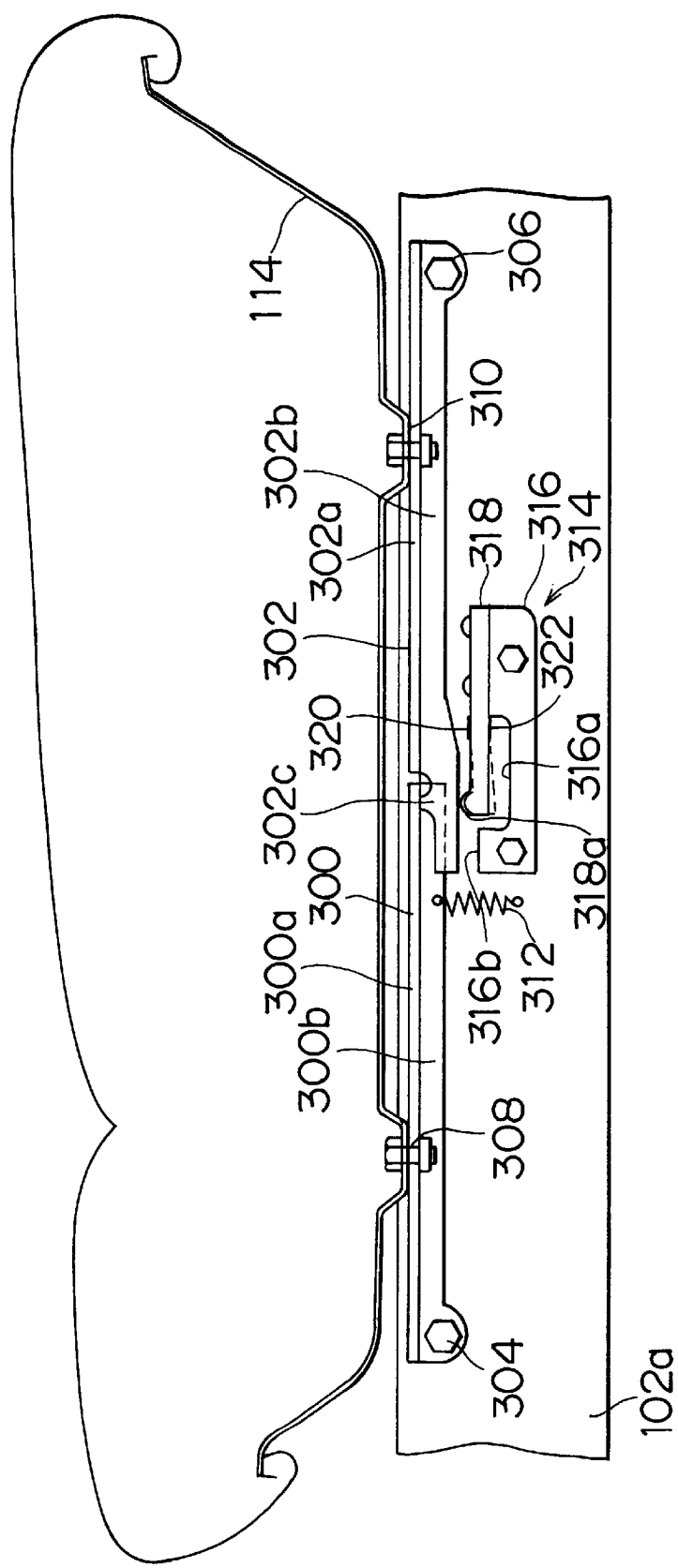
FIG. 11 is a side view of the seat occupant detection apparatus of the embodiment.

A fourth embodiment of the invention will next be described. FIG. 10 is a perspective view of portions of a seat occupant detection apparatus according to this embodiment. Although FIG. 10 shows only an arrangement on the side of a right-side lower seat rail 18 from the viewpoint of a seat occupant, an arrangement substantially symmetrical to that shown in FIG. 2 is provided on the side of the lower seat rail 16. FIG. 11 is a side view of the seat occupant detection apparatus shown in FIG. 10. Portions in FIGS. 10 and 11 substantially the same as those in FIG. 1 are represented by the same reference characters, and will not be described again.

As shown in FIGS. 10 and 11, the seat occupant detection apparatus of this embodiment has a forward beam member 300 and a rearward beam member 302. The forward beam member 300 and the rearward beam member 302 are members having generally L-shaped sections. The forward beam member 300 and the rearward beam member 302 have horizontal flange portions 300a, 302a extending substantially horizontally, and vertical flange portions 300b, 302b extending substantially vertically downward from side portions of the horizontal flange portions 300a, 302a, respectively. The forward beam member 300 and the rearward beam member 302 both have such great flexural rigidity that the members can be substantially considered as rigid bodies.

The forward beam member 300 is connected, at a forward end of the vertical flange portion 300b in the traveling direction of the vehicle, to a mounting flange 102a of a seat frame 102 by a bolt 304 so that the forward beam member 300 is pivotable up and down. The rearward beam member 302 is connected, at a rearward end of the vertical flange portion 302b in the traveling direction of the vehicle, to the mounting flange 102a of the seat frame 102 by a bolt 306 so that the rearward beam member 302 is pivotable up and down. Hereinafter, the connecting points of the forward beam member 300 and the rearward beam member 302 to the seat frame 102 that are provided by the bolts 304, 306 are referred to as "beam supporting points".

The horizontal flange portion 302a of the rearward beam member 302 terminates in a forward end portion of the rearward beam member 302 in the vehicle traveling direction. The forward end portion of the rearward beam member 302 has a contact portion 302c protruded upward from the vertical flange portion 302b. A distal end of the contact portion 302c is in contact with a lower surface of a rearward end portion of the horizontal flange portion 300a of the forward beam member 300. The forward beam member 300 and the rearward beam member 302 are disposed so that the point of contact between the horizontal flange portion 300a of the forward beam member 300 and the contact portion 302c of the rearward beam member 302 (hereinafter, referred to as "beam contact point") substantially coincides with a midpoint between the beam supporting points.

A seat pan 114 is secured to the forward beam member 300 and the rearward beam member 302 by fasteners 308 and 310, respectively, at a predetermined position on the forward beam member 300 and a predetermined position on the rearward beam member 302 that are substantially equidistant from the beam contact point (hereinafter, the predetermined positions will be referred to as "seat pan mounting points"). A spring 312 is connected at its one end to the forward beam member 300, at a predetermined position thereon between the beam contact point and the seat pan mounting point on the forward beam member 300. Another end of the spring 312 is connected to the seat frame 102. The spring 312 functions to reduce oscillations of the forward beam member 300 and the rearward beam member 302 caused by vibrations of the vehicle.

The seat occupant detection apparatus of this embodiment also has a sensor unit 314. The sensor unit 314 has a base member 316 secured to the seat frame 102, and a sensor beam 318 retained to the base member 316. The sensor beam 318 has a predetermined flexural rigidity in the vertical direction. The base member 316 has a recess 316a that is open upward. An upward protrusion formed on the left side of the recess 316a in FIG. 11 functions as a stopper 316b that restricts downward displacement of the forward beam member 300 and the rearward beam member 302.

The sensor beam 318 is mounted on an upper surface of the base member 316 so that the sensor beam 318 is protruded into a space above the recess 316a from the right side to the left in FIG. 11, thus forming a cantilever construction. An upward protrusion 318a is formed on an upper surface of a distal end portion of the sensor beam 318. The sensor unit 314 is disposed so that a distal end of the protrusion 318a of the sensor beam 318 contacts a lower surface of the rearward beam member 302, at a position immediately under the beam contact point or in the vicinity thereof.

Strain sensors 320, 322 are disposed on upper and lower surfaces of a portion of the sensor beam 318 that extends above the recess 316a. The strain sensors 320, 322 are electrically connected to a controller 120 (not shown in FIG. 10 or 11), and outputs to the controller 120 signals corresponding to strain of the sensor beam 318, that is, corresponding to flexure of the sensor beam 318. Based on the difference between the output signals of the strain sensors 320, 322, the controller 120 detects the flexure of the sensor beam 318, as in the second embodiment.

In the above-described construction, the load of an occupant on a vehicle seat is input from the seat pan 114 to the seat pan mounting points on the forward beam member 300 and the rearward beam member 302. The protrusion 318a of the sensor beam 318 receives the input of a load $Fs=2*F*(D_1/D_2)$ where $D_1$ is the distance between the beam supporting points and the seat pan mounting points; $D_2$ is the distance between the beam supporting points and the beam contact point; and F is the load input to each seat pan mounting point. Corresponding to the load Fs, a downward flexure occurs to the sensor beam 318. Therefore, based on the flexure of the sensor beam 318 detected from the output signals of the strain sensors 320, 322, the controller 120 can detect the load of the seated occupant.

In this embodiment, the load of a seated occupant is transmitted to the sensor beam 318 via the forward beam member 300 and the rearward beam member 302, as described above. Based on the flexure caused in the sensor beam 318 by the load transmitted, the load of the seated occupant is detected. That is, the load measurement precision is mainly affected by the flexural rigidity of the sensor beam 318, but is not affected by the characteristics of the forward beam member 300 and the rearward beam member 302 except the precisions in setting the distances $D_1$, $D_2$. Therefore, a high measurement precision can be secured merely by controlling the flexural rigidity of the sensor beam 318, which is a relatively small component part. Hence, the manufacturing precision requirement of the forward beam member 300 and the rearward beam member 302 can be mitigated. Consequently, the embodiment allows a reduction of the production cost of the apparatus.

Figure 12:
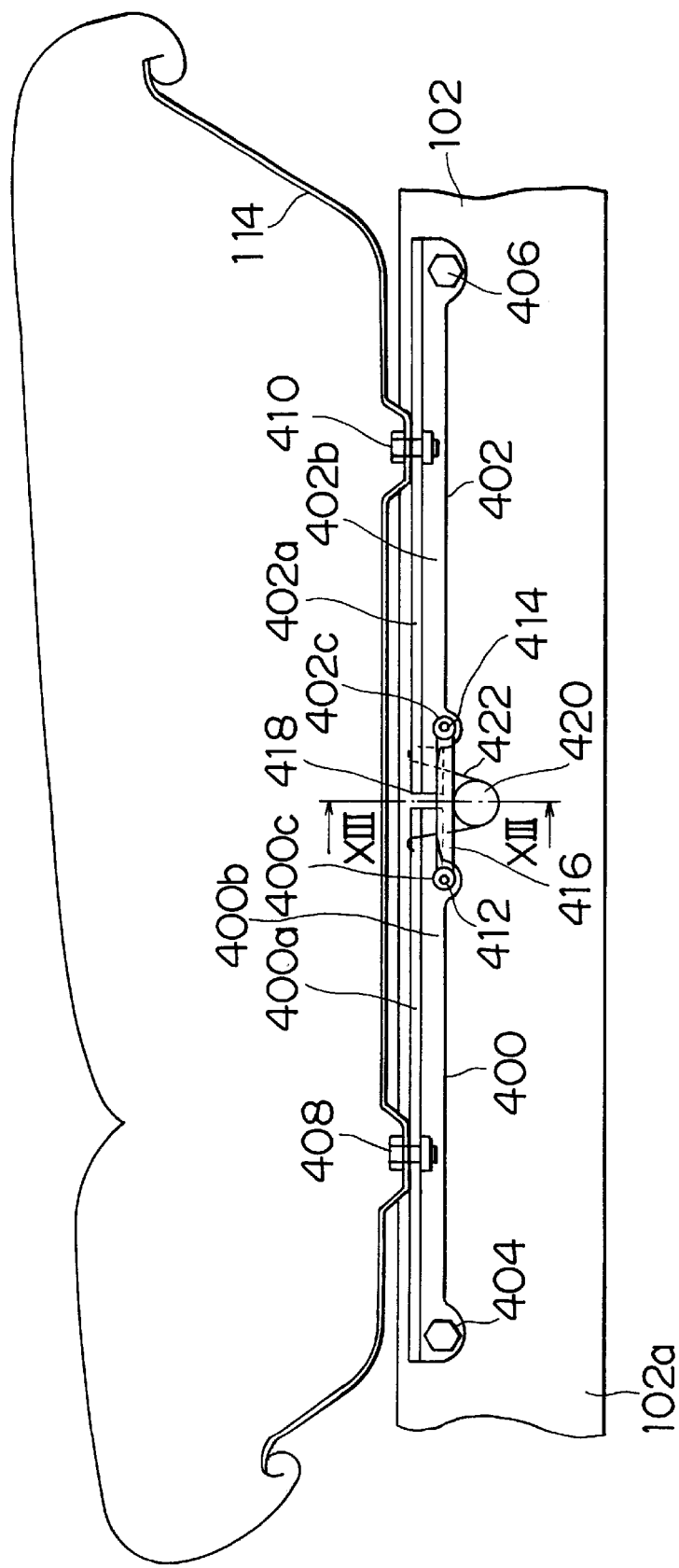
FIG. 12 is a side view of a seat occupant detection apparatus according to a fifth embodiment of the invention.
Figure 13:
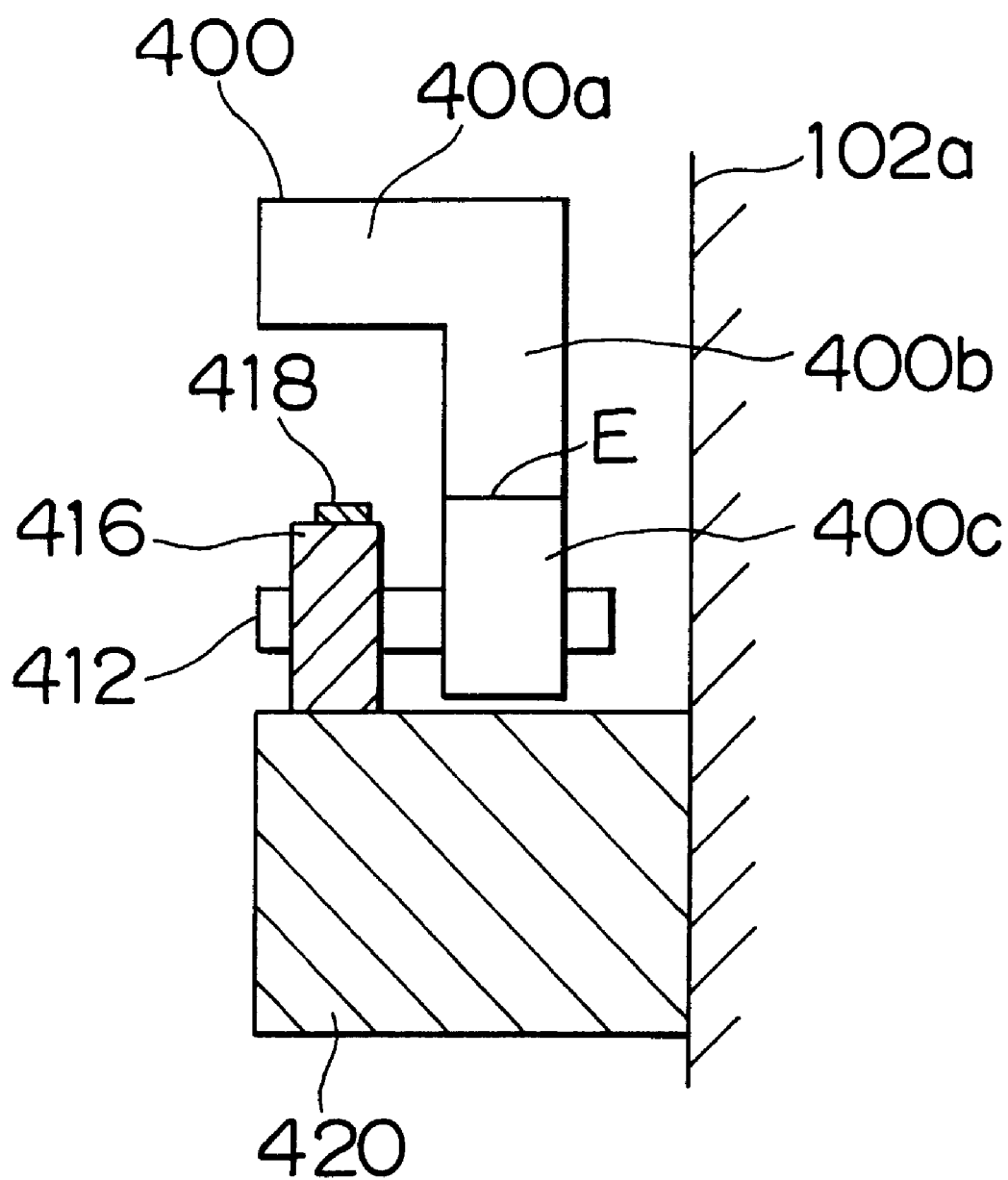
FIG. 13 is a cross-sectional view of the seat occupant detection apparatus of the embodiment taken on line XIII—XIII indicated in FIG. 12.

A fifth embodiment of the invention will next be described. FIG. 12 is a side view of a seat occupant detection apparatus of this embodiment. An arrangement as shown in FIG. 12 is symmetrically provided on each of right and left sides of a vehicular seat. FIG. 13 is a cross-sectional view taken along line XIII—XIII in FIG. 12. As shown in FIG. 12, the seat occupant detection apparatus of this embodiment has a forward beam member 400 and a rearward beam member 402 that have substantially equal lengths. The forward beam member 400 and the rearward beam member 402 are members having generally L-shaped sections. The forward beam member 400 and the rearward beam member 402 have horizontal flange portions 400a, 402a extending substantially horizontally, and vertical flange portions 400b, 402b extending substantially vertically downward from side portions of the horizontal flange portions 400a, 402a, respectively. The forward beam member 400 and the rearward beam member 402 both have such great flexure rigidity that the members can be substantially considered as rigid bodies.

The forward beam member 400 is connected, at a forward end of the vertical flange portion 400b in the traveling direction of the vehicle, to a mounting flange 102a of a seat frame 102 by a bolt 404 so that the forward beam member 400 is pivotable up and down. The rearward beam member 402 is connected, at a rearward end of the vertical flange portion 402b in the traveling direction of the vehicle, to the mounting flange 102a of the seat frame 102 by a bolt 406 so that the rearward beam member 402 is pivotable up and down. A predetermined interval is provided between a rearward end surface of the forward beam member 400 and a forward end surface of the rearward beam member 402. A seat pan 114 is secured to the forward beam member 400 and the rearward beam member 402 by fasteners 408 and 410, respectively, at a predetermined position (seat pan mounting point) on the forward beam member 400 and a predetermined position (seat pan mounting point) on the rearward beam member 402 that are symmetrical about a middle point of the aforementioned interval (hereinafter, referred to as "beam middle point").

The forward beam member 400 and the rearward beam member 402 have pin mounting portions 400c and 402c, respectively, at positions that are equidistant from the beam middle point and that are near the adjacent forward and rearward ends of the two beam members. Pins 412, 414 extending in the direction of a width of the vehicle are connected to the pin mounting portions 400c, 402c, respectively. A sensor beam 416 is connected between the pins 412, 414 so that the sensor beam 416 is pivotable relative to the forward beam member 400 and the rearward beam member 402. A strain sensor 418 is disposed on an upper surface of a middle portion of the sensor beam 416 in the direction of its length. The strain sensor 418 is electrically connected to a controller 120 (not shown in FIG. 12 or 13), and outputs to the controller 120 a signal corresponding to strain that occurs on the upper surface of the middle portion of the sensor beam 416, that is, corresponding to flexure of the sensor beam 416. Based on the output signal of the strain sensor 418, the controller 120 detects the strain occurring in the sensor beam 416.

A cylindrical fulcrum member 420 is secured to the mounting flange 102a of the seat frame 102 so that the axial direction thereof coincides with the direction of the vehicle width. The fulcrum member 420 is disposed so that a central axis thereof intersects a vertical line that passes through the beam middle point, and so that while there is no occupant on the seat, the fulcrum member 420 contacts a lower surface of the sensor beam 416 without flexing the sensor beam 416.

A spring 422 is provided between the forward beam member 400 and the rearward beam member 402. The spring 422 is a member formed by bending a belt-like plate spring into a generally U-shaped form. The spring 422 is disposed extending substantially around a lower half of the fulcrum member 420. The spring 422 is connected at opposite ends thereof to the forward beam member 400 and the rearward beam member 402. The spring 422 reduces oscillations of the forward beam member 400 and the rearward beam member 402 caused by vibrations of the vehicle.

According to the above-described construction, when an occupant sits on the seat, the load of the occupant is inputted to the seat pan mounting points of the forward beam member 400 and the rearward beam member 402, via the seat pan 114. Therefore, the forward beam member 400 and the rearward beam member 402 pivot downward. A middle portion of the sensor beam 412 is prevented from moving downward by the fulcrum member 420. Therefore, the sensor beam 412 flexes with the point of contact thereof with the fulcrum member 420 serving as a fulcrum so that opposite end portions of the sensor beam 412 move downward. Such a flexure causes strains on the upper and lower surfaces of the sensor beam 412. Hence, based on the strains of the sensor beam 412 detected by the output signals of the strain sensors 418, the controller 120 can detect the load of the seated occupant.

As shown in FIG. 13, lower end surfaces (indicated by reference character E in FIG. 13) of the vertical flange portions 400b, 402b of the forward beam member 400 and the rearward beam member 402 face the fulcrum member 420 with a predetermined interval therebetween, when there is no occupant on the vehicular seat. Therefore, the downward pivoting of the forward beam member 400 and the rearward beam member 402 is restricted by the contact of the beam members with the fulcrum member 420, so that excessive displacements of the forward beam member 400 and the rearward beam member 402 are prevented.

Similar to the fourth embodiment, the fifth embodiment has a construction where strain occurs only in the sensor beam 412, so that the manufacturing precision requirement of the forward beam member 400 and the rearward beam member 402 can be mitigated. Therefore, the cost of the apparatus can be reduced.

Figure 14:
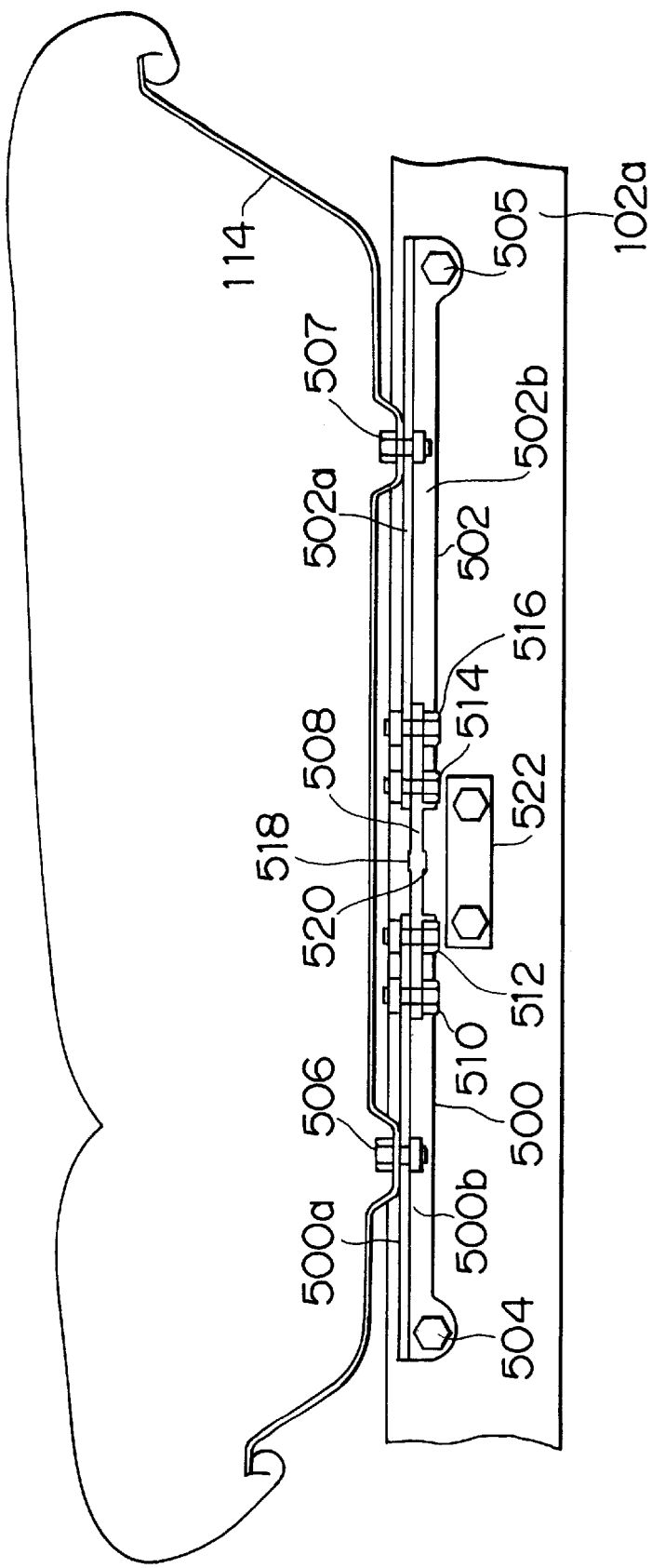
FIG. 14 is a side view of a seat occupant detection apparatus according to a sixth embodiment of the invention.

A sixth embodiment of the invention will next be described. FIG. 14 is a side view of a seat occupant detection apparatus of this embodiment. An arrangement as shown in FIG. 14 is symmetrically provided on each of right and left sides of a vehicular seat. As shown in FIG. 14, the seat occupant detection apparatus of this embodiment has a forward beam member 500 and a rearward beam member 502 that have substantially equal lengths. The forward beam member 500 and the rearward beam member 502 are members having generally L-shaped sections. The forward beam member 500 and the rearward beam member 502 have horizontal flange portions 500a, 502a extending substantially horizontally, and vertical flange portions 500b, 502b extending substantially vertically downward from side portions of the horizontal flange portions 500a, 502a, respectively.

The forward beam member 500 is connected, at a forward end of the vertical flange portion 500b in the traveling direction of the vehicle, to a mounting flange 102a of a seat frame 102 by a bolt 504 so that the forward beam member 500 is pivotable up and down. The rearward beam member 502 is connected, at a rearward end of the vertical flange portion 502b in the traveling direction of the vehicle, to the mounting flange 102a of the seat frame 102 by a bolt 505 so that the rearward beam member 502 is pivotable up and down. A predetermined interval is provided between a rearward end surface of the forward beam member 500 and a forward end surface of the rearward beam member 502. A seat pan 114 is secured to the forward beam member 500 and the rearward beam member 502 by bolts 506 and 507, respectively, at a predetermined position (seat pan mounting point) on the forward beam member 500 and a predetermined position (seat pan mounting point) on the rearward beam member 502 that are symmetrical about a middle point of the aforementioned interval (beam middle point).

A sensor beam 508 interconnects the rearward end portion of the forward beam member 500 and the forward end portion of the rearward beam member 502. The sensor beam 508 is secured to the forward beam member 500 and the rearward beam member 502 by bolts 510, 512 and bolts 514, 516, respectively. The sensor beam 508 is formed in such a manner that the section modulus of the sensor beam 508 with respect to a horizontal neutral axis thereof is made sufficiently smaller than the section modulus of the forward beam member 500 and the rearward beam member 502 with respect to a horizontal neutral axis thereof by, for example, considerably reducing the thickness of the sensor beam 508 in comparison with the thickness of the rearward beam member 500 and the rearward beam member 502.

Strain sensors 518, 520 are disposed on upper and lower surfaces of a portion of the sensor beam 416 that is located at the middle between the forward beam member 500 and the rearward beam member 502. The strain sensors 518, 520 are electrically connected to a controller 120 (not shown in FIG. 14). The strain sensors 518, 520 output to the controller 120 signals corresponding to strains that occur on the sensor beam 508.

A stopper 522 is provided below the sensor beam 508. The stopper 522 is secured to the mounting flange 102a of the seat frame 102. The stopper 522 is disposed so as to contact the forward beam member 500 and the rearward beam member 502 when the beam members are displaced downward to a predetermined amount. Therefore, the stopper 522 prevents excessive displacements of the forward beam member 500 and the rearward beam member 502.

Figure 15A:
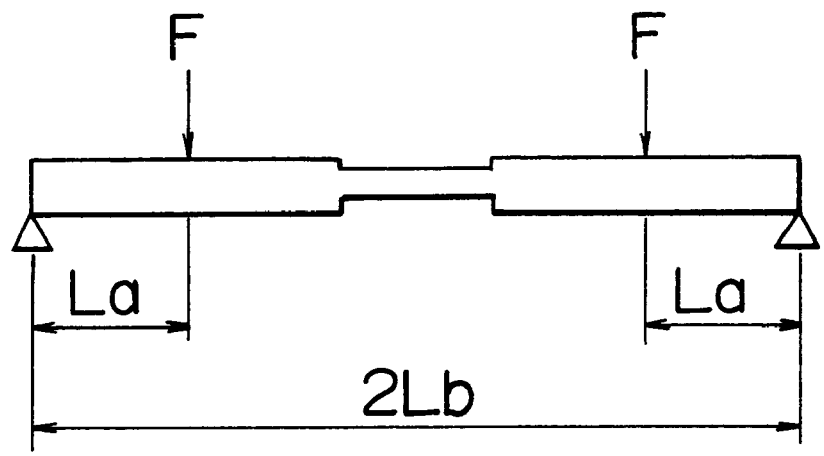
FIG. 15A is a model diagram wherein a forward beam member, a rearward beam member and a sensor beam of the seat occupant detection apparatus of the embodiment are considered as a single beam.
Figure 15B:
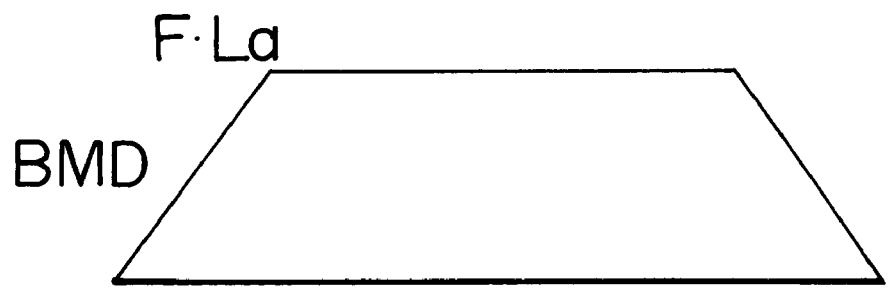
FIG. 15B is a bending moment diagram (BMD) of the beam indicated in FIG.

According to the above-described construction, when an occupant sits on the vehicular seat, the load corresponding to the occupant's weight is inputted to the seat pan mounting points of the forward beam member 500 and the rearward beam member 502, via the seat pan 114. Due to the load, moments occur to the forward beam member 500, the sensor beam 508 and the rearward beam member 502 in such directions as to flex them into downwardly convex forms. If these three beam members are considered as an integral beam with distances La between the opposite end fulcrums and the load input points, an inter-fulcrum distance 2*Lb, and an input load F as indicated in FIG. 15A, a bending moment diagram (BMD) as shown in FIG. 15B can be obtained. As indicated in FIG. 15B, the moment that occurs in the beam assumes a maximum value F*La in a region between the load input points that includes a middle thereof (i.e., the sensor beam 508). In general, the strain that occurs on an outer edge surface of a beam in response to a given moment is inversely proportional to the section modulus with respect to a neutral axis. Therefore, in this embodiment, the sensor beam 508 disposed at the middle position, where the moment becomes maximum, is constructed so as to have a significantly lower section modulus than the forward beam member 500 and the rearward beam member 502. Hence, great strain occurs in the sensor beam 508. Consequently, in the embodiment, the controller 120 is able to detect the load F inputted to the seat pan mounting points, that is, the load of a seated occupant, with a high precision, based on the strains of the sensor beam 508 detected by the strain sensors 518, 520.

In FIGS. 15A and 15B, if the loads input to the load input points change, the moment at the midpoint of the beam (i.e., the midpoint of the sensor beam 508) remains unchanged as long as the sum of the loads remains the same, as described with reference to FIG. 3. In this embodiment, since strain at the midpoint of the sensor beam 508 is detected, the load of a seated occupant can be accurately detected even if the frontrear distribution of load changes due to a forward or rearward shift of the seated position of the occupant.

In the first to sixth embodiments, the fulcrums of the beams for detecting the load of a seated occupant are provided on the seat frame 102. This construction eliminates the need to separately provide a member for supporting the beams, and therefore allows a weight reduction of the apparatus.

Furthermore, in the second to sixth embodiments, the load of a seated occupant is detected as a total of the loads acting on a forward portion and a rearward portion of the seat. However, if the load of a seated occupant is to be detected together with the distribution of loads on the forward and rearward portions of the seat, a construction as shown, for example, in FIG. 16 may be adopted.

Figure 16:
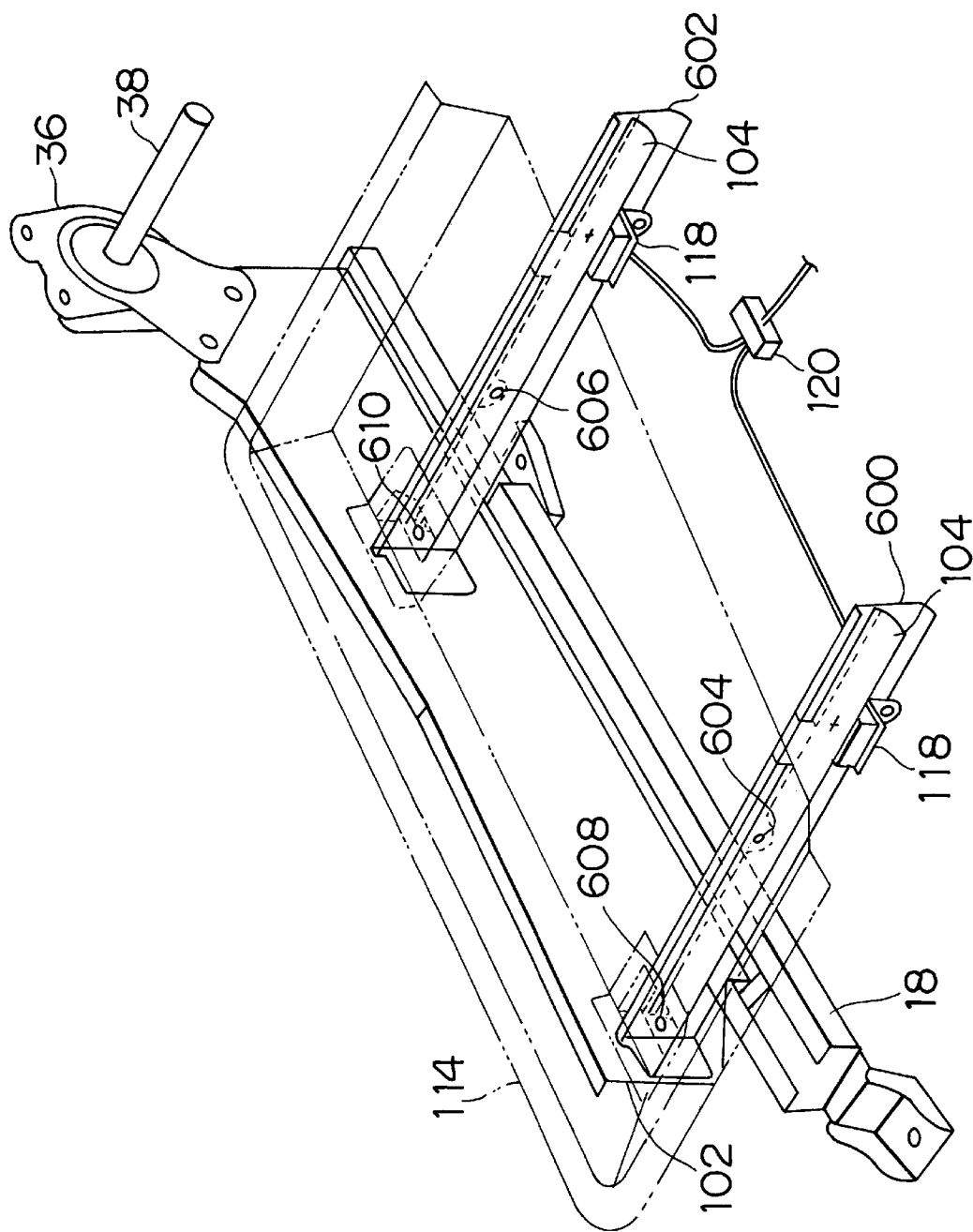
FIG. 16 is a perspective view of a construction for measuring a front-rear distribution of the load of a seated occupant.

In the construction shown in FIG. 16, right and left-side mounting flanges 102a of a seat frame 102 are interconnected at their forward and rearward end portions by cross members 600, 602. The cross members 600, 602 support, for example, beam members 104 via fasteners 604, 606, as in the second embodiment. A seat pan 114 is mounted to the beam members 104 by fasteners 608, 610. Flexures of the beam members 104 are detected by sensor units 118 and a controller 120. This construction makes it possible to detect the load on a forward portion of the seat based on the flexure of the beam member 104 mounted on the forward cross member 600 and detect the load on a rearward portion of the seat based on the flexure of the beam member 104 mounted on the rearward cross member 602.

Still further, although in the second to sixth embodiments, flexure of each beam member at the midpoint thereof is detected, and the load of a seated occupant is detected based on the detected flexures, it is also possible to detect flexures of each beam member at two points that are a predetermined distance forward and rearward from the midpoint of the beam. In this case, a front-rear distribution of the load of a seated occupant can be detected by determining loads acting on forward and rearward portions of each beam member based on the flexures detected at the forward and rearward points, and calculating a sum of the loads on the forward portions of the right and left-side beam members and a sum of the loads on the rearward portions of the right and left-side beam members.

Although in the second to sixth embodiments, the load-detecting beam member is connected between the seat frame 102 and the seat pan 114, the invention is not restricted to this construction. For example, a seat frame 102 is divided into upper and lower portions, and a loaddetecting beam member may be connected between the upper and lower portions of the seat frame 102.

Further, although in the fourth to sixth embodiments, the beam supporting points are positioned outwardly of the seat pan mounting points, it is also possible to position seat pan mounting points outwardly of beam supporting points.

In the first to sixth embodiments, the beam members 20, 22, 104, the forward beam members 300, 400, 500, and the rearward beam members 302, 402, 502 correspond to a beam member in the invention. The strain sensors 24, 26, 132, 134, 212, 214 and the controllers 28, 120 correspond to load detecting means in the invention. The sensor beams 130, 206 correspond to a second elastic beam member in the invention. The sensor beams 318, 416 correspond to an elastic member in the invention. The sensor beam 508 corresponds to a small-section modulus portion in the invention.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements.

What is claimed is:

1. A seat occupant detection apparatus comprising:
    a beam member connected between a seat frame and a seat pan of a vehicular seat, that is displaced in accordance with a load of an occupant seated on vehicular seat;
    load detecting means for detecting the load based on an amount of displacement of the beam member when the occupant is seated in the vehicular seat; and
    a strain amplifying mechanism that amplifies a strain associated with a flexure of the beam member, and wherein the load detecting means detects the load based on the strain amplified by the strain amplifying mechanism.

2. A seat occupant detection apparatus according to claim 1, wherein the beam member is connected, at first mounting positions provided near opposite end portions of the beam member, to one of the seat pan and the seat frame, and the beam member is connected to another one of the seat pan and the seat frame, at second mounting positions that are positioned spaced a predetermined distance inward from the first mounting positions on the beam member.

3. A seat occupant detection apparatus according to claim 1, wherein the beam member is an elastic member having a predetermined flexural rigidity, and the load detecting means detects the load based on a flexure of the beam member.

4. A seat occupant detection apparatus according to claim 3, wherein the strain amplifying mechanism comprises:
    a second elastic beam member that is supported by one of the seat an and the seat frame and that has a length that is less than a length of he beam member;
    a transmission member that transmits the flexure of the beam member to the second elastic beam member,
    wherein the load detecting means detects the load based on the strain of the second elastic beam member.

5. A seat occupant detection apparatus according to claim 3,
    wherein the strain amplifying mechanism is a small-section modulus portion provided by forming a first portion of the beam member so that a section modulus of the portion with respect to a neutral axis of the first portion is less than a section modulus of another site of the beam member, and
    wherein the load detecting means detects the load based on the strain of the small-section modulus portion.

6. A seat occupant detection apparatus according to claim 5, wherein the small-section modulus portion is formed by making a width of the first portion of the beam member smaller than a width of other portion of the beam member.

7. A seat occupant detection apparatus according to claim 1,
    wherein the beam member is an elastic member having a predetermined flexural rigidity, and
    wherein the load detecting means detects the load based on an amount of flexure of a substantially middle portion of the beam member in a direction of a length of the beam member.

8. A seat occupant detection apparatus according to claim 1, wherein the beam member is substantially a rigid body and is pivotably connected to the seat pan and the seat frame.

9. A seat occupant detection apparatus according to claim 8, further comprising an elastic member that elastically deforms in accordance with a pivot of the beam member, the load detecting means detecting the load based on an amount of elastic deformation of the elastic member.

10. a vehicular seat assembly capable of detecting presence of an occupant, comprising:
    a vehicular seat;
    a beam member connected between a seat frame and a seat pan of the vehicular seat, that is displaced in accordance with a load of the occupant seated on the vehicular seat;
    a strain amplifying mechanism that amplifies a strain associated with a flexure of the beam member; and
    detecting means for detecting the load based on the strain amplified by the strain amplifying mechanism.

11. A seat occupant detection apparatus comprising:
    a beam member connected between a seat frame and a seat pan of a vehicular seat, that is displaced in accordance with a load of an occupant seated on vehicular seat;
    strain amplifying mechanism that amplifies a strain associated with a flexure of the beam member; and
    a load detector detecting the load based on the strain amplified by the strain amplifying mechanism.

* * * * *

UNITED STATES PATENT AND TRADEMARK OFFICE
CERTIFICATE OF CORRECTION

PATENT NO. : 6,349,602 B1
DATED : February 26, 2002
INVENTOR(S) : Makoto Hamada and Osamu Fukawatase It is certified that error appears in the above-identified patent and that said Letters Patent is hereby corrected as shown below:

<u>Column 18,</u>
Line 2, "an" should read -- pan --.
Line 3, "he" should read -- the --.
Line 40, "a vehicular" should read -- A vehicular --.
Line 55, "on vehicular" should read -- on the vehicular --.
Line 57, "strain amplifying" should read -- a strain amplifying --.

Signed and Sealed this

Twenty-first Day of May, 2002

Attest:

Attesting Officer

JAMES E. ROGAN
Director of the United States Patent and Trademark Office